United States Patent
Zhou et al.

(10) Patent No.: US 11,195,254 B2
(45) Date of Patent: Dec. 7, 2021

(54) INTERFRAME REGISTRATION AND ADAPTIVE STEP SIZE-BASED NON-UNIFORMITY CORRECTION METHOD FOR INFRARED IMAGE

(71) Applicant: XIDIAN UNIVERSITY, Xi'an (CN)

(72) Inventors: Huixin Zhou, Xi'an (CN); Dong Zhao, Xi'an (CN); Runda Qian, Xi'an (CN); Lixin Guo, Xi'an (CN); Xiuping Jia, Xi'an (CN); Jun Zhou, Xi'an (CN); Maosen Huang, Xi'an (CN); Hanlin Qin, Xi'an (CN); Bo Yao, Xi'an (CN); Yue Yu, Xi'an (CN); Huan Li, Xi'an (CN); Jiangluqi Song, Xi'an (CN); Bingjian Wang, Xi'an (CN); Kuanhong Cheng, Xi'an (CN); Juan Du, Xi'an (CN); Shangzhen Song, Xi'an (CN)

(73) Assignee: XIDIAN UNIVERSITY, Xi'an (CN)

(*) Notice: Subject to any disclaimer, the term of this patent is extended or adjusted under 35 U.S.C. 154(b) by 0 days.

(21) Appl. No.: 16/980,794

(22) PCT Filed: Mar. 28, 2018

(86) PCT No.: PCT/CN2018/080925
§ 371 (c)(1),
(2) Date: Sep. 14, 2020

(87) PCT Pub. No.: WO2019/183843
PCT Pub. Date: Oct. 3, 2019

(65) Prior Publication Data
US 2020/0410637 A1   Dec. 31, 2020

(51) Int. Cl.
*G06T 3/00* (2006.01)
*G06T 7/38* (2017.01)
(Continued)

(52) U.S. Cl.
CPC .............. *G06T 3/0068* (2013.01); *G06T 5/50* (2013.01); *G06T 7/0002* (2013.01); *G06T 7/38* (2017.01); *G06T 2207/10048* (2013.01)

(58) Field of Classification Search
CPC ....... G06T 3/0068; G06T 5/50; G06T 7/0002; G06T 7/38; G06T 2207/10016; G06T 2207/10048
See application file for complete search history.

(56) References Cited

U.S. PATENT DOCUMENTS 5,471,240 A * 11/1995 Prager ..................... H04N 5/33
250/332
10,172,582 B2 * 1/2019 Dascal ................ A61B 6/5247
(Continued)

FOREIGN PATENT DOCUMENTS

CN           101776487 A  *  7/2010
CN           102289788 A      12/2011
(Continued)

OTHER PUBLICATIONS

International Search Report in corresponding PCT Application No. PCT/CN2018/080925, dated Dec. 29, 2018.
(Continued)

*Primary Examiner* — Mekonen T Bekele
(74) *Attorney, Agent, or Firm* — Westbridge IP LLC

(57) ABSTRACT

An interframe registration and adaptive step size-based non-uniformity correction method for an infrared image, comprising: first calculating a normalized cross-power spectrum of n-th and (n−1)-th original infrared images with the non-uniformity, and then calculating a horizontal relative displacement and a vertical relative displacement of the n-th and (n−1)-th original infrared images with the non-unifor-
(Continued)

mity; calculating a space variance and a time variance of each pixel of the n-th original infrared image with the non-uniformity, using the obtained space variance and time variance to calculate an adaptive iterative step size of each pixel of the n-th original infrared image with the non-uniformity, and using the iterative step size to update a gain correction coefficient and a bias correction coefficient; finally, performing non-uniformity correction on the pixel in an overlapping area of the n-th and (n−1)-th original infrared images with the non-uniformity.

6 Claims, 5 Drawing Sheets

(51) Int. Cl.
  *G06T 5/50* (2006.01)
  *G06T 7/00* (2017.01)

(56) References Cited

U.S. PATENT DOCUMENTS

| 11,030,759 | B2* | 6/2021 | Adil | G06T 5/20 |
| 2017/0135663 | A1* | 5/2017 | Dascal | G06T 5/50 |
| 2017/0178307 | A1 | 6/2017 | Yan et al. | |
| 2021/0090273 | A1* | 3/2021 | Adil | G06T 7/0002 |

FOREIGN PATENT DOCUMENTS

| CN | 102538973 A | | 7/2012 |
| CN | 103049879 A | * | 4/2013 |
| CN | 104268870 A | | 1/2015 |
| CN | 106934771 A | * | 7/2017 |

OTHER PUBLICATIONS

Written Opinion in corresponding PCT Application No. PCT/CN2018/080925, dated Dec. 29, 2018.

* cited by examiner

INTERFRAME REGISTRATION AND ADAPTIVE STEP SIZE-BASED NON-UNIFORMITY CORRECTION METHOD FOR INFRARED IMAGE

TECHNICAL FIELD

The disclosure relates to the field of infrared image processing, and more particularly, to a method for non-uniformity correction of an infrared image based on an interframe registration an adaptive step size.

BACKGROUND

Due to the influences of manufacturing technologies and materials, and infrared detector will produce different outputs even under the same incident radiation conditions. That is, response non-uniformities will be generated. In addition, inconsistent charge transmission efficiencies of different pixels, influences of IRFPA blind pixels, influences of infrared optical systems, non-uniformities caused by signal amplification, 1/f noises, non-uniformities caused by A/D conversion, external temperatures and other factors are all the reasons for the non-uniformities. An infrared image has a low resolution, a low signal-to-noise ratio and a poor contrast. Therefore, before an infrared image is to be used, non-uniformity correction has to be performed on the infrared image to improve a quality of the infrared image.

At present, methods for non-uniformity correction of an infrared image mainly include two categories: calibration-based algorithms and scene-based algorithms. The scene-based algorithms use scene information to update correction parameters, without suspending the infrared detector for calibration. Therefore, the scene-based algorithms have become the main research objects in recent years. Typical scene-based algorithms include a time-domain high-pass filtering method, a neural network method, a constant statistics method, a Kalman filtering method and an interframe registration method.

The interframe registration method has a fast convergence speed, completely depends on scenes, and has a certain non-uniformity correction effect. However, the correction effect of the interframe registration method is not ideal when the non-uniformity is strong.

SUMMARY

In view of this, a main objective of the disclosure is to provide a method for non-uniformity correction of an infrared image based on interframe registration and adaptive step size.

To this end, the technical solutions of the disclosure are implemented as follows.

Aspects of the disclosure provides a method for non-uniformity correction of an infrared image based on an interframe registration and adaptive step size, where the method includes: establishing a linear response model of a pixel of the infrared image, and obtaining a correction formula through inverse transformation; determining a relative displacement of $n^{th}$ frame and $(n-1)^{th}$ frames of original infrared images with non-uniformity and a space variance and a time variance of each pixel of the $n^{th}$ frame of original infrared image with non-uniformity, and determining an adaptive iterative step size of each pixel of the $n^{th}$ frame of original infrared image with non-uniformity according to the space variance and the time variance; determining a gain correction coefficient and a bias correction coefficient of each pixel in an overlapped area of the $n^{th}$ and $(n-1)^{th}$ frames of original infrared images with non-uniformity according to an error function of the $(n-1)^{th}$ frame of original infrared image with non-uniformity and an adaptive iterative step size of an $i^{th}$ row and a $j^{th}$ column in the $n^{th}$ frame of original infrared image with non-uniformity; and performing non-uniformity correction on each pixel in the overlapped area of the $n^{th}$ and $(n-1)^{th}$ frames of original infrared images with non-uniformity according to the gain correction coefficient and the bias correction coefficient of each pixel in the overlapped area of the $n^{th}$ and $(n-1)^{th}$ frames of original infrared images with non-uniformity, and the correction formula.

In an example, after the performing non-uniformity correction on each pixel in the overlapped area of the $n^{th}$ frame and $(n-1)^{th}$ frames of original infrared images with non-uniformity according to the gain correction coefficient and the bias correction coefficient of each pixel in the overlapped area of the $n^{th}$ frame and $(n-1)^{th}$ frames of original infrared images with non-uniformity and the correction formula, the method further includes: judging whether the $n^{th}$ frame of image is a last frame of image in a sequence of original infrared images with non-uniformity, and completing the non-uniformity correction when the $n^{th}$ frame of image is the last frame of image; and continuing to perform non-uniformity correction on subsequent frames of images when the $n^{th}$ frame of image is not the last frame of image.

In an example, the establishing the linear response model of the pixel of the infrared image, and obtaining the correction formula through the inverse transformation, includes:

(101) establishing the linear response model of the pixel of the infrared image according to the following formula:

$$y_n(i,j) = g_n(i,j) x_n(i,j) + o_n(i,j)$$

where $g_n(i,j)$ and $o_n(i,j)$ respectively denote a gain coefficient and a bias coefficient of a pixel in an $i^{th}$ row and a $j^{th}$ column in an $n^{th}$ frame of infrared image, $x_n(i,j)$ denotes a true input gray value of the $i^{th}$ row and the $j^{th}$ column in the $n^{th}$ frame of infrared image, and $y_n(i,j)$ denotes an output gray value containing non-uniformity in the $i^{th}$ row and the $j^{th}$ column in the $n^{th}$ frame of infrared image; and (102) representing $x_n(i,j)$ through inverse transformation according to the following formula:

$$x_n(i,j) = w_n(i,j) y_n(i,j) + b_n(i,j)$$

where $$w_n(i,j) = \frac{1}{g_n(i,j)}$$

denotes a gain correction coefficient of a pixel in the $i^{th}$ row and the $j^{th}$ column in the overlapped area of the $n^{th}$ and $(n-1)^{th}$ frames of original infrared images with non-uniformity, and $$b_n(i,j) = -\frac{o_n(i,j)}{g_n(i,j)}$$

denotes a bias correction coefficient of the pixel in the $i^{th}$ row and the $j^{th}$ column in the overlapped area of the $n^{th}$ and $(n-1)^{th}$ frames of original infrared images with non-uniformity.

In the above solution, the determining the relative displacement of the $n^{th}$ and $(n-1)^{th}$ frames of original infrared images with non-uniformity, includes:

(201) obtaining the output gray value $y_n(i,j)$ containing non-uniformity in the $i^{th}$ row and the $j^{th}$ column in the $n^{th}$ frame of infrared image via the relative displacement of an output gray value $y_{n-1}(i,j)$ containing non-uniformity in the $i^{th}$ row and the $j^{th}$ column in the $(n-1)^{th}$ frame of infrared image according to the following formula:

$$y_n(i,j) = y_{n-1}(i - d_x, j - d_y)$$

where $d_x$ and $d_y$ respectively denote relative displacements of $y_n(i,j)$ and $y_{n-1}(i,j)$ in horizontal and vertical directions;

(202) calculating a normalized cross-power spectrum between $y_n(i,j)$ and $y_{n-1}(i,j)$ by Fourier transform according to the following formula:

$$\hat{c}(u, v) = \frac{Y_n(u, v) Y_{n-1}^*(u, v)}{|Y_n(u, v) Y_{n-1}^*(u, v)|}$$

where $\hat{c}(u,v)$ denotes the normalized cross-power spectrum, * denotes complex conjugate, $y_n(u,v)$ and $Y_{n-1}(u,v)$ respectively denote Fourier transform of $y_n(i,j)$ and Fourier transform of $y_{n-1}(i,j)$, and u and V respectively denote coordinates of a Fourier domain; and (203) calculating the relative displacements of $y_n(i,j)$ and $y_{n-1}(i,j)$ in the horizontal and vertical directions according to the following formula:

$$(d_x, d_y) = \underset{i,j}{\mathrm{argmax}} \mathrm{Re}\{FFT^{-1}(\hat{c}(u, v))\}$$

where $FFT^{-1}$ denotes inverse Fourier transform, Re denotes taking a real part, and $$\underset{i,j}{\mathrm{argmax}}$$

denotes a row and a column where a maximum value is located in a matrix obtained after taking a real part of a result of the inverse Fourier transform.

In an example, the determining the space variance and the time variance of each pixel of the $n^{th}$ frame of original infrared image with non-uniformity, and determining the adaptive iterative step size of each pixel of the $n^{th}$ frame of original infrared image with non-uniformity according to the space variance and the time variance, includes:

(301) determining a space variance $D_n^S(i,j)$ in a 3*3 template centered on the pixel in the $i^{th}$ row and the $j^{th}$ column in the $n^{th}$ frame of original infrared image with non-uniformity;

(302) determining a time variance $D_n^T(i,j)$ of the pixel in the $i^{th}$ row and the $j^{th}$ column from $(n-m)^{th}$ to $n^{th}$ frames of original infrared images with non-uniformity according to the following formula:

$$D_n^T(i,j) = D\{Y_n(u,v), Y_{n-1}(u,v), \ldots, Y_{n-m}(u,v)\}$$

where D denotes a variance operation, and m denotes a positive integer less than n; and (303) obtaining the adaptive iterative step size $step_n(i,j)$ of the $i^{th}$ row and the $j^{th}$ column in the $n^{th}$ frame of original infrared image with non-uniformity in combination with the space variance and the time variance according to the following formula:

$$step_n(i, j) = \frac{a D_n^T(i, j)}{1 + D_n^S(i, j)}$$

where a denotes a fixed constant.

In an example, the determining the gain correction coefficient and the bias correction coefficient of each pixel in the overlapped area of the $n^{th}$ and $(n-1)^{th}$ frames of original infrared images with non-uniformity according to the error function of the $(n-1)^{th}$ frame of original infrared image with non-uniformity and the adaptive iterative step size of the $i^{th}$ row and the $j^{th}$ column in the $n^{th}$ frame of original infrared image with non-uniformity, includes:

(401) determining an error function $e_n(i,j)$ of each pixel in the overlapped area of the $n^{th}$ and $(n-1)^{th}$ frames of original infrared images with non-uniformity according to the following formula:

$$e_n(i,j) = (w_n(i-d_x, j-d_y) y_{n-1}(i-d_x, j-d_y) + b_n(i-d_x, j-d_y)) - (w_n(i,j)) y_n(i,j) + b_n(i,j))$$

determining an error function $e_{n-1}(i,j)$ in an $i^{th}$ row and a $j^{th}$ column of an overlapped area of $(n-1)^{th}$ and $(n-2)^{th}$ frames of original infrared images with non-uniformity in the same way;

(402) determining $w_n(i,j)$ in combination with $step_n(i,j)$, $e_{n-1}(i,j)$ and $y_{n-1}(i,j)$ according to the following formula:

$$w_n(i,j) = w_{n-1}(i,j) + step_n(i,j) e_{n-1}(i,j) y_{n-1}(i,j) \text{(overlapped area)}$$

where $w_{n-1}(i,j)$ denotes a gain correction coefficient of a pixel in the $i^{th}$ row and the $j^{th}$ column in the overlapped area of the $(n-1)^{th}$ and $(n-2)^{th}$ frames of original infrared images with non-uniformity, and overlapped area denotes the overlapped area of the $n^{th}$ and $(n-1)^{th}$ frames of original images with non-uniformity; and (403) determining $b_n(i,j)$ in combination with $step_n(i,j)$ and $e_{n-1}(i,j)$ according to the following formula:

$$b_n(i,j) = b_{n-1}(i,j) + step_n(i,j) e_{n-1}(i,j) \text{(overlapped area)}$$

where $b_{n-1}(i,j)$ denotes a bias correction coefficient of the pixel in the $i^{th}$ row and the $j^{th}$ column in the overlapped area of the $(n-1)^{th}$ and $(n-2)^{th}$ frames of original infrared images with non-uniformity.

Compared with the prior art, the disclosure has the following technical effects:

the disclosure can adaptively adjust according to spatial and temporal characteristics of the infrared image, and has a faster convergence speed and a better correction effect.

DETAILED DESCRIPTION

To make the objectives, technical solutions, and advantages of the disclosure clearer, the disclosure will be further described in detail with reference to the accompanying drawings and embodiments. It should be understood that the specific embodiments described herein are only used to explain the disclosure, but are not intended to limit the disclosure.

Figure 1:
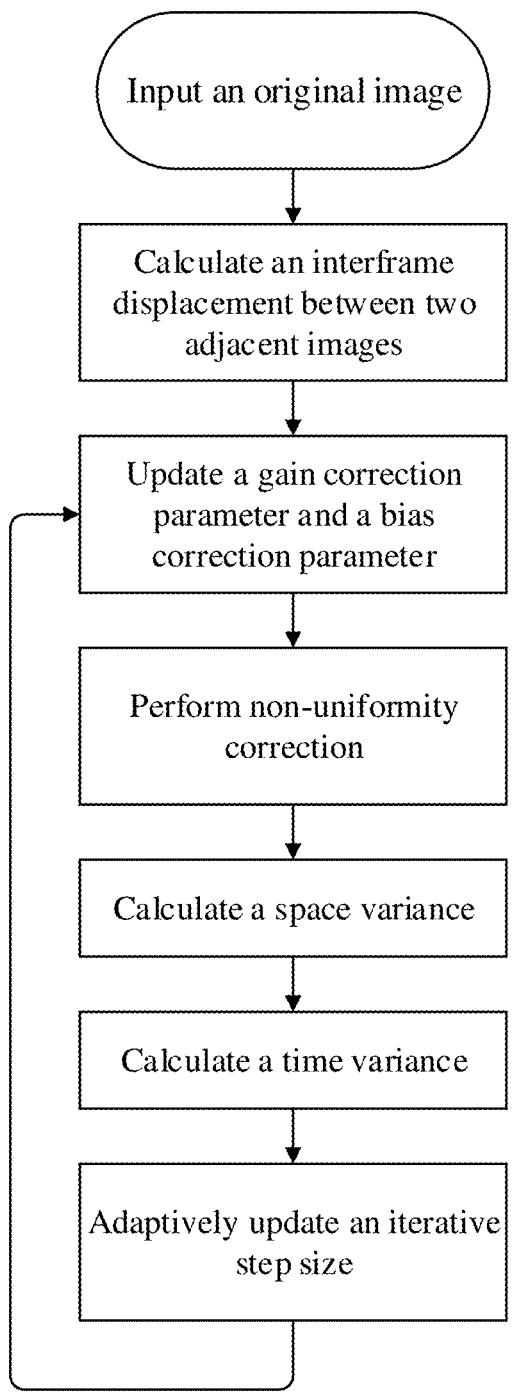
FIG. 1 is a flow chart of the disclosure.

An aspect of the disclosure provides a method of non-uniformity correction of an infrared image based on an interframe registration and adaptive step size. As shown in FIG. 1, the method includes the following steps.

In step 1: all images in an original infrared image sequence are input.

Figure 2:
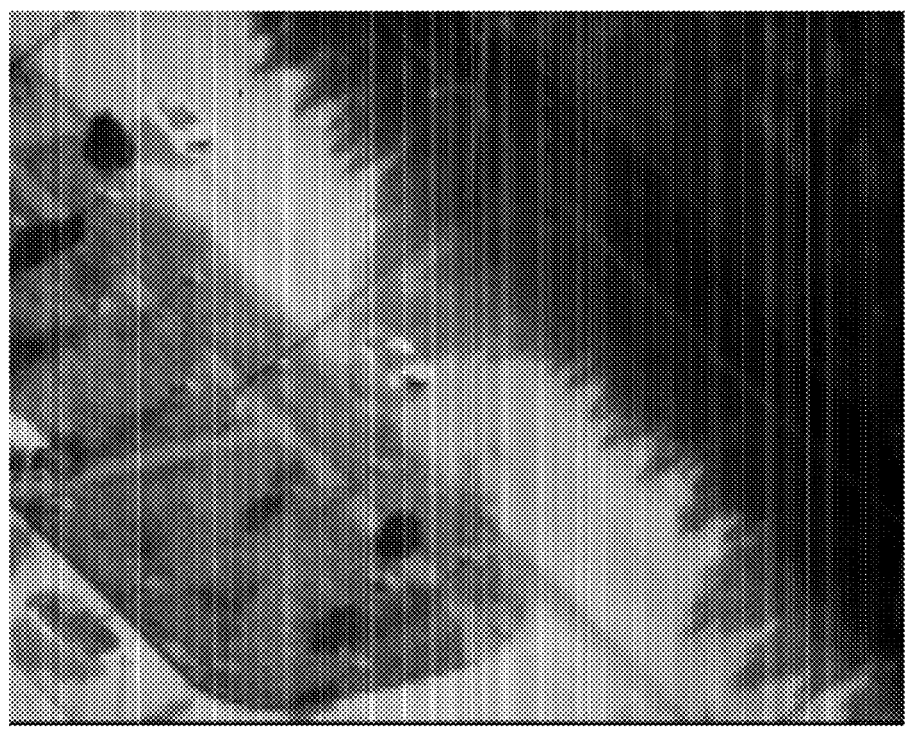
FIG. 2 is a $500^{th}$ frame of image in an original image sequence with non-uniformity according to the disclosure.

Specifically, FIG. 2 is a 500$^{th}$ frame of original infrared image with non-uniformity in the embodiment of the disclosure. There are 500 frames of images in the original image sequence with non-uniformity, and each frame of image has a size of 320*256 pixels. It can be seen from FIG. 2 that the original image has obvious fixed-pattern noise, and an image quality thereof is seriously affected.

In step 2: a linear response model of a pixel of the infrared image is established, and a correction formula is obtained through inverse transformation.

The step 2 includes:

(201) establishing the linear response model of the pixel of the infrared image according to the following formula:

$$y_n(i,j)=g_n(i,j)x_n(i,j)+o_n(i,j)$$

where $g_n(i,j)$ and $o_n(i,j)$ respectively denote a gain coefficient and a bias coefficient of a pixel in an $i^{th}$ row and a $j^{th}$ column in an $n^{th}$ frame of infrared image, $x_n(i,j)$ denotes a true input gray value of the $i^{th}$ row and the $j^{th}$ column in the $n^{th}$ frame of infrared image, and $y_n(i,j)$ denotes an output gray value containing non-uniformity in the $i^{th}$ row and the $j^{th}$ column in the $n^{th}$ frame of infrared image; and (202) representing $x_n(i,j)$ through inverse transformation according to the following formula:

$$x_n(i,j)=w_n(i,j)y_n(i,j)+b_n(i,j)$$

where $$w_n(i,j) = \frac{1}{g_n(i,j)}$$

denotes a gain correction coefficient of a pixel in the $i^{th}$ row and the $j^{th}$ column in the overlapped area of the $n^{th}$ and $(n-1)^{th}$ frames of original infrared images with non-uniformity, and $$b_n(i,j) = -\frac{o_n(i,j)}{g_n(i,j)}$$

denotes a bias correction coefficient of the pixel in the $i^{th}$ row and the $j^{th}$ column in the overlapped area of the $n^{th}$ and $(n-1)^{th}$ frames of original infrared images with non-uniformity.

In step 3: a relative displacement of the $n^{th}$ and $(n-1)^{th}$ frames of original infrared images with non-uniformity is calculated.

The step 3 includes:

(301) obtaining the output gray value $y_n(i,j)$ containing non-uniformity in the $i^{th}$ row and the $j^{th}$ column in the $n^{th}$ frame of infrared image via the relative displacement of an output gray value $y_{n-1}(i,j)$ containing non-uniformity in the $i^{th}$ row and the $j^{th}$ column in the $(n-1)^{th}$ frame of infrared image according to the following formula:

$$y_n(i,j)=y_{n-1}(i-d_x,j-d_y);$$

where $d_x$ and $d_y$ respectively denote relative displacements of $y_n(i,j)$ and $y_{n-1}(i,j)$ in horizontal and vertical directions;

(302) calculating a normalized cross-power spectrum between $y_n(i,j)$ and $y_{n-1}(i,j)$ by Fourier transform according to the following formula:

$$\hat{c}(u,v) = \frac{Y_n(u,v)Y_{n-1}^*(u,v)}{|Y_n(u,v)Y_{n-1}^*(u,v)|}$$

where $\hat{c}(u,v)$ denotes the normalized cross-power spectrum, * denotes complex conjugate, $Y_n(u,v)$ and $Y_{n-1}(u,v)$ respectively denote Fourier transform of $y_n(i,j)$ and Fourier transform of $y_{n-1}(i,j)$, and u and v respectively denote coordinates of a Fourier domain; and (303) calculating the relative displacements of $y_n(i,j)$ and $y_{n-1}(i,j)$ in the horizontal and vertical directions according to the following formula:

$$(d_x, d_y) = \underset{i,j}{\mathrm{argmax}}\,\mathrm{Re}\{FFT^{-1}(\hat{c}(u,v))\}$$

where $FFT^{-1}$ denotes inverse Fourier transform, Re denotes taking a real part, and $$\underset{i,j}{\mathrm{argmax}}$$

denotes a row and a column where a maximum value is located in a matrix obtained after taking a real part of a result of the inverse Fourier transform.

In step 4: a space variance and a time variance of each pixel of the $n^{th}$ frame of original infrared image with non-uniformity are calculated, and an adaptive iterative step size of each pixel of the $n^{th}$ frame of original infrared image with non-uniformity is determined according to the space variance and the time variance.

The step 4 includes:

(401) determining a space variance $D_n^s(i,j)$ in a 3*3 template centered on the pixel in the $i^{th}$ row and the $j^{th}$ column in the $n^{th}$ frame of original infrared image with non-uniformity;

(402) determining a time variance $D_n^T(i,j)$ of the pixel in the $i^{th}$ row and the $j^{th}$ column from $(n-m)^{th}$ to $n^{th}$ frames of original infrared images with non-uniformity according to the following formula:

$$D_n^T(i,j)=D\{Y_n(u,v),Y_{n-1}(u,v),\ldots,Y_{n-m}(u,v)\}$$

where D denotes a variance operation, m denotes a positive integer less than n, and a value of m is set as 10; and (403) obtaining the adaptive iterative step size $step_n(i,j)$ of the $i^{th}$ row and the $j^{th}$ column in the $n^{th}$ frame of original infrared image with non-uniformity, in combination with the space variance and the time variance according to the following formula:

$$step_n(i, j) = \frac{aD_n^T(i, j)}{1 + D_n^S(i, j)}$$

where a denotes a fixed constant, and a value of a is set as 0.07.

In step 5: a gain correction coefficient and a bias correction coefficient of each pixel in an overlapped area of the $n^{th}$ and $(n-1)^{th}$ frames of original infrared images with non-uniformity are determined according to an error function of the $(n-1)^{th}$ frame of original infrared image with non-uniformity and an adaptive iterative step size of an $i^{th}$ row and a $j^{th}$ column in the $n^{th}$ frame of original infrared image with non-uniformity.

The step 5 includes:

(501) determining an error function $e_n(i,j)$ of each pixel in the overlapped area of the $n^{th}$ and $(n-1)^{th}$ frames of original infrared images with non-uniformity according to the following formula:

$$e_n(i,j) = (w_n(i-d_x, j-d_y) y_{n-1}(i-d_x, j-d_y) + b_n(i-d_x, j-d_y)) - (w_n(i,j)) y_n(i,j) + b_n(i,j))$$

determining an error function $e_{n-1}(i,j)$ in an $i^{th}$ row and a $j^{th}$ column of an overlapped area of $(n-1)^{th}$ and $(n-2)^{th}$ frames of original infrared images with non-uniformity in the same way;

(502) determining $w_n(i,j)$ in combination with $step_n(i,j)$, $e_{n-1}(i,j)$ and $y_{n-1}(i,j)$ according to the following formula:

$$w_n(i,j) = w_{n-1}(i,j) + step_n(i,j) e_{n-1}(i,j) y_{n-1}(i,j) \text{(overlapped area)}$$

where $w_{n-1}(i,j)$ denotes a gain correction coefficient of a pixel in the $i^{th}$ row and the $j^{th}$ column in the overlapped area of the $(n-1)^{th}$ and $(n-2)^{th}$ frames of original infrared images with non-uniformity, and overlapped area denotes the overlapped area of the $n^{th}$ and $(n-1)^{th}$ frames of original infrared images with non-uniformity; and (503) determining $b_n(i,j)$ in combination with $step_n(i,j)$ and $e_{n-1}(i,j)$ according to the following formula:

$$b_n(i,j) = b_{n-1}(i,j) + step_n(i,j) e_{n-1}(i,j) \text{(overlapped area)}$$

where $b_{n-1}(i,j)$ denotes a bias correction coefficient of the pixel in the $i^{th}$ row and the $j^{th}$ column in the overlapped area of the $(n-1)^{th}$ and $(n-2)^{th}$ frames of original infrared images with non-uniformity; and the bias correction coefficients of the first frame of original infrared image with non-uniformity are all set as 0, $b_n(i,j)=0$.

In step 6: non-uniformity correction is performed on pixels in the overlapped area of the $n^{th}$ and $(n-1)^{th}$ frames of original infrared images with non-uniformity according to the gain correction coefficient and the bias correction coefficient of the $n^{th}$ frame of original infrared image with non-uniformity and the correction formula.

Figure 3:
FIG. 3 is a $500^{th}$ frame of image corrected through an method for non-uniformity correction of an infrared image based on interframe registration and adaptive step size according to the disclosure.
Figure 4:
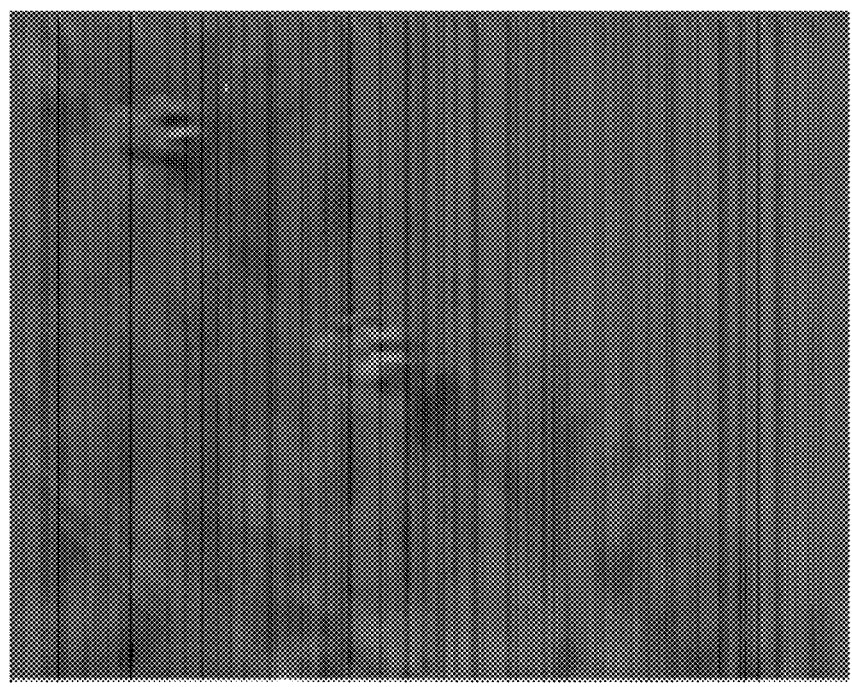
FIG. 4 is a difference image between the $500^{th}$ frame of image corrected by the method for non-uniformity correction of an infrared image based on the interframe registration and adaptive step size, and the 500$^{th}$ frame of image in the original image sequence with non-uniformity according to the disclosure.
Figure 5:
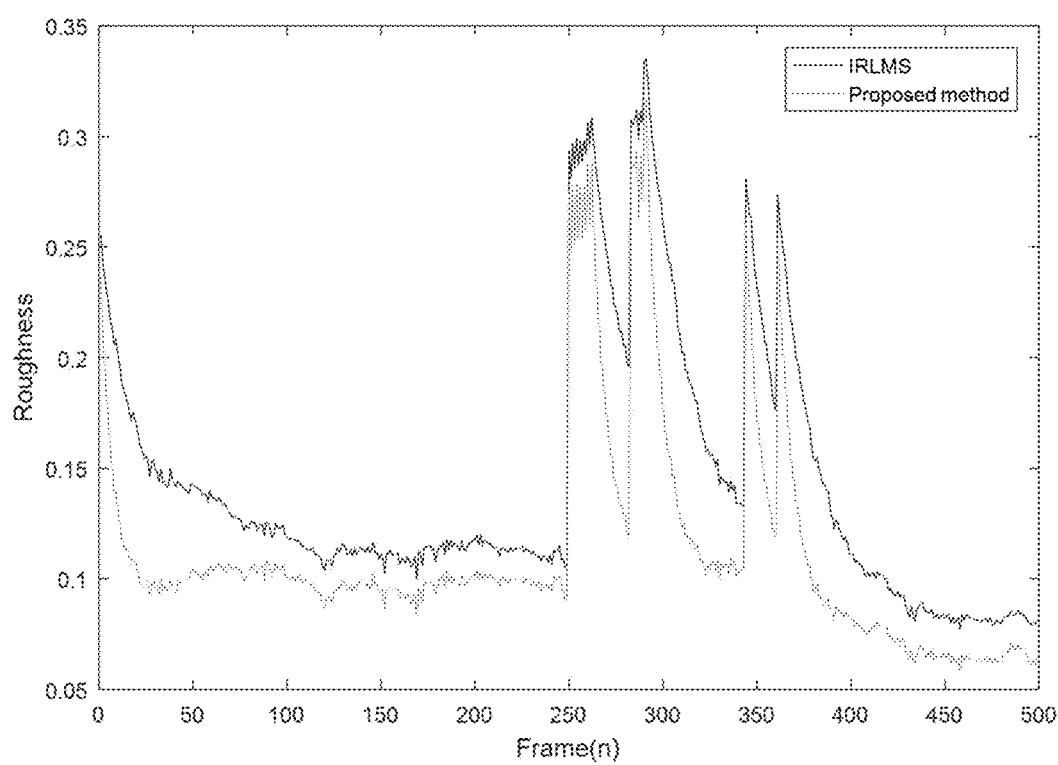
FIG. 5 is a roughness graph of the disclosure.

Specifically, FIG. 3 shows a correction result of the $500^{th}$ frame of image in the original image sequence with non-uniformity in the embodiment of the disclosure. It can be seen from FIG. 3 that telegraph poles above and in a lower right corner of the corrected image become clearly visible, and almost no banded fixed-pattern noise can be seen. FIG. 4 is a difference image between the correction result of the $500^{th}$ frame of image in the original image sequence with non-uniformity and the $500^{th}$ frame of image in the original image sequence with non-uniformity in the embodiment of the disclosure. It can be seen from FIG. 4 that the difference image includes fixed-pattern noises. FIG. 5 is a roughness graph in the embodiment of the disclosure. It can be seen from FIG. 5 that compared with an IRLMS method, the correction result obtained by the method for non-uniformity correction of an infrared image based on an interframe registration and adaptive step size has lower roughness, which indicates that the method for non-uniformity correction of an infrared image based on an interframe registration and adaptive step size can reduce the non-uniformity of the original infrared image more effectively.

In accordance with the method for non-uniformity correction of an infrared image based on an interframe registration and adaptive step size according to the disclosure, the normalized cross-power spectrum of two adjacent infrared images is calculated, and then the relative displacement of the two adjacent infrared images is determined by using the normalized cross-power spectrum obtained, the space variance and the time variance of each pixel are determined, then the space variance and the time variance are used to calculate the adaptive iterative step size of each pixel, and the iterative step size is used to update the gain correction coefficient and the bias correction coefficient, and finally, the non-uniformity correction is performed on the overlapped area of the two adjacent infrared images.

The above only describes preferred embodiments of the disclosure, and is not intended to limit the scope of protection of the disclosure.

The invention claimed is:

1. A method for non-uniformity correction of an infrared image based on interframe registration and adaptive step size, wherein the method comprises:
    establishing a linear response model of a pixel of the infrared image, and obtaining a correction formula through inverse transformation;
    determining a relative displacement of $n^{th}$ frame and $(n-1)^{th}$ frames of original infrared images with non-uniformity, a space variance and a time variance of each pixel of the $n^{th}$ frame of original infrared image with non-uniformity;
    determining an adaptive iterative step size of each pixel of the $n^{th}$ frame of original infrared image with non-uniformity according to the space variance and the time variance;
    determining a gain correction coefficient and a bias correction coefficient of each pixel in an overlapped area of the $n^{th}$ and $(n-1)^{th}$ frames of original infrared images with non-uniformity according to an error function of the $(n-1)^{th}$ frame of original infrared image with non-uniformity and an adaptive iterative step size of an $i^{th}$ row and a $j^{th}$ column in the $n^{th}$ frame of original infrared image with non-uniformity; and
    performing non-uniformity correction on each pixel in the overlapped area of the $n^{th}$ and $(n-1)^{th}$ frames of original infrared images with non-uniformity according to the gain correction coefficient and the bias correction coefficient of each pixel in the overlapped area of the $n^{th}$ and $(n-1)^{th}$ frames of original infrared images with non-uniformity and the correction formula.

2. The method for non-uniformity correction of the infrared image based on the interframe registration and adaptive step size according to claim 1, wherein after the performing non-uniformity correction on each pixel in the overlapped area of the $n^{th}$ frame and $(n-1)^{th}$ frames of original infrared images with non-uniformity according to the gain correction coefficient and the bias correction coefficient of each pixel in the overlapped area of the $n^{th}$ frame and $(n-1)^{th}$ frames of original infrared images with non-uniformity and the correction formula, the method further comprises:

judging whether the $n^{th}$ frame of image is a last frame of image in a sequence of original infrared images with non-uniformity, and completing the non-uniformity correction when the $n^{th}$ frame of image is the last frame of image; and continuing to perform non-uniformity correction on subsequent frames of images when the $n^{th}$ frame of image is not the last frame of image.

3. The method for non-uniformity correction of the infrared image based on interframe registration and adaptive step size according to claim 1, wherein the establishing the linear response model of the pixel of the infrared image, and obtaining the correction formula through the inverse transformation comprises:

(101) establishing the linear response model of the pixel of the infrared image according to the following formula:

$$y_n(i,j) = g_n(i,j) x_n(i,j) + o_n(i,j)$$

wherein $g_n(i,j)$ and $o_n(i,j)$ respectively represent a gain coefficient and a bias coefficient of a pixel in an $i^{th}$ row and a $j^{th}$ column in an $n^{th}$ frame of infrared image, $x_n(i,j)$ denotes a true input gray value of the $i^{th}$ row and the $j^{th}$ column in the $n^{th}$ frame of infrared image, and $y_n(i,j)$ denotes an output gray value containing non-uniformity in the $i^{th}$ row and the $j^{th}$ column in the $n^{th}$ frame of infrared image; and (102) representing $x_n(i,j)$ through inverse transformation according to the following formula:

$$x_n(i,j) = w_n(i,j) y_n(i,j) + b_n(i,j)$$

wherein $$w_n(i,j) = \frac{1}{g_n(i,j)}$$

denotes a gain correction coefficient of a pixel in the $i^{th}$ row and the $j^{th}$ column in the overlapped area of the $n^{th}$ and $(n-1)^{th}$ frames of original infrared images with non-uniformity, and $$b_n(i,j) = -\frac{o_n(i,j)}{g_n(i,j)}$$

denotes a bias correction coefficient of the pixel in the $i^{th}$ row and the $j^{th}$ column in the overlapped area of the $n^{th}$ and $(n-1)^{th}$ frames of original infrared images with non-uniformity.

4. The method for non-uniformity correction of the infrared image based on the interframe registration and adaptive step size according to claim 3, wherein the determining the relative displacement of the $n^{th}$ and $(n-1)^{th}$ frames of original infrared images with non-uniformity comprises:

(201) obtaining the output gray value $y_n(i,j)$ containing non-uniformity in the $i^{th}$ row and the $j^{th}$ column in the $n^{th}$ frame of infrared image via the relative displacement of an output gray value $y_{n-1}(i,j)$ containing non-uniformity in the $i^{th}$ row and the $j^{th}$ column in the $(n-1)^{th}$ frame of infrared image according to the following formula:

$$y_n(i,j) = y_{n-1}(i - d_x, j - d_y)$$

wherein $d_x$ and $d_y$ respectively denotes relative displacements of $y_n(i,j)$ and $y_{n-1}(i,j)$ in horizontal and vertical directions;

(202) calculating a normalized cross-power spectrum between $y_n(i,j)$ and $y_{n-1}(i,j)$ by Fourier transform according to the following formula:

$$\hat{c}(u,v) = \frac{Y_n(u,v) Y_{n-1}^*(u,v)}{|Y_n(u,v) Y_{n-1}^*(u,v)|}$$

wherein $\hat{c}(u,v)$ denotes the normalized cross-power spectrum, * denotes complex conjugate, $Y_n(u,v)$ and $Y_{n-1}(u,v)$ respectively denote Fourier transform of $y_n(i,j)$ and Fourier transform of $y_{n-1}(i,j)$, and u and v respectively denote coordinates of a Fourier domain; and (203) calculating the relative displacements of $y_n(i,j)$ and $y_{n-1}(i,j)$ in the horizontal and vertical directions according to the following formula:

$$(d_x, d_y) = \underset{i,j}{\arg\max} \operatorname{Re}\{FFT^{-1}(\hat{c}(u,v))\}$$

wherein $FFT^{-1}$ denotes inverse Fourier transform, Re denotes taking a real part, and $$\underset{i,j}{\arg\max}$$

denotes a row and a column where a maximum value is located in a matrix obtained after taking a real part of a result of the inverse Fourier transform.

5. The method for non-uniformity correction of the infrared image based on the interframe registration and adaptive step size according to claim 4, wherein the determining the space variance and the time variance of each pixel of the $n^{th}$ frame of original infrared image with non-uniformity, and determining the adaptive iterative step size of each pixel of the $n^{th}$ frame of original infrared image with non-uniformity according to the space variance and the time variance, comprises: following formula:

$$D_n^T(i,j) = D\{Y_n(u,v), Y_{n-1}(u,v), \ldots, Y_{n-m}(u,v)\}$$

wherein D denotes a variance operation, and m denotes a positive integer less than n; and (303) obtaining the adaptive iterative step size $\text{step}_n(i,j)$ of the $i^{th}$ row and the $j^{th}$ column in the $n^{th}$ frame of original infrared image with non-uniformity in combination with the space variance and the time variance according to the following formula:

$$\text{step}_n(i,j) = \frac{a D_n^T(i,j)}{1 + D_n^S(i,j)}$$

wherein a denotes a fixed constant.

6. The method for non-uniformity correction of the infrared image based on the interframe registration and adaptive step size according to claim 5, wherein the determining the gain correction coefficient and the bias correction coefficient of each pixel in the overlapped area of the $n^{th}$ and $(n-1)^{th}$ frames of original infrared images with non-uniformity according to the error function of the $(n-1)^{th}$ frame of original infrared image with non-uniformity and the adaptive iterative step size of the $i^{th}$ row and the $j^{th}$ column in the $n^{th}$ frame of original infrared image with non-uniformity, comprises:

(401) determining an error function $e_n(i,j)$ of each pixel in the overlapped area of the $n^{th}$ and $(n-1)^{th}$ frames of original infrared images with non-uniformity according to the following formula:

$$e_n(i,j)=(w_n(i-d_x,j-d_y)y_{n-1}(i-d_x,j-d_y)+b_n(i-d_x,j-d_y))-(w_n(i,j))y_n(i,j)+b_n(i,j))$$

determining an error function $e_{n-1}(i,j)$ in an $i^{th}$ row and a $j^{th}$ column of an overlapped area of $(n-1)^{th}$ and $(n-2)^{th}$ frames of original infrared images with non-uniformity in the same way;

(402) determining $w_n(i,j)$ in combination with $step_n(i,j)$, $e_{n-1}(i,j)$ and $y_{n-1}(i,j)$ according to the following formula:

$$w_n(i,j)=w_{n-1}(i,j)+step_n(i,j)e_{n-1}(i,j)y_{n-1}(i,j) \text{(overlapped area)}$$

wherein $w_{n-1}(i,j)$ denotes a gain correction coefficient of a pixel in the $i^{th}$ row and the $j^{th}$ column in the overlapped area of the $(n-1)^{th}$ and $(n-2)^{th}$ frames of original infrared images with non-uniformity, and overlapped area represents the overlapped area of the $n^{th}$ and $(n-1)^{th}$ frames of original infrared images with non-uniformity; and (403) determining $b_n(i, j)$ in combination with $step_n(i,j)$ and $e_{n-1}(i,j)$ according to the following formula:

$$b_n(i,j)=b_{n-1}(i,j)+step_n(i,j)e_{n-1}(i,j) \text{(overlapped area)}$$

wherein $b_{n-1}(i,j)$ denotes a bias correction coefficient of the pixel in the $i^{th}$ row and the $j^{th}$ column in the overlapped area of the $(n-1)^{th}$ and $(n-2)^{th}$ frames of original infrared images with non-uniformity.

\* \* \* \* \*